United States Patent
Leng et al.

(10) Patent No.: US 10,738,163 B2
(45) Date of Patent: Aug. 11, 2020

(54) QUICK RESPONSIVE, SHAPE MEMORY THERMOSET POLYIMIDE AND PREPARATION METHOD THEREOF

(71) Applicant: Harbin Institute of Technology, Heilongjiang (CN)

(72) Inventors: Jingsong Leng, Heilongjiang (CN); Xinli Xiao, Heilongjiang (CN); Yanju Liu, Heilongjiang (CN); Deyan Kong, Heilongjiang (CN)

(73) Assignee: Harbin Institute of Technology, Heilongjiang (CN)

( * ) Notice: Subject to any disclaimer, the term of this patent is extended or adjusted under 35 U.S.C. 154(b) by 80 days.

(21) Appl. No.: 16/195,006

(22) Filed: Nov. 19, 2018

(65) Prior Publication Data
US 2019/0085133 A1 Mar. 21, 2019

Related U.S. Application Data

(62) Division of application No. 15/110,143, filed as application No. PCT/CN2015/070280 on Jan. 7, 2015, now Pat. No. 10,155,850.

(30) Foreign Application Priority Data

May 23, 2014 (CN) .......................... 2014 1 0221959

(51) Int. Cl.
*C08G 73/10* (2006.01)
*C08G 73/02* (2006.01)

(52) U.S. Cl.
CPC ....... *C08G 73/1078* (2013.01); *C08G 73/026* (2013.01); *C08G 73/0273* (2013.01); *C08G 73/101* (2013.01); *C08G 73/1028* (2013.01); *C08G 73/1042* (2013.01); *C08G 73/1071* (2013.01); *C08G 73/1082* (2013.01)

(58) Field of Classification Search
CPC ............ C08G 73/1071; C08G 73/1082; C08G 73/1078
See application file for complete search history.

(56) References Cited

U.S. PATENT DOCUMENTS

| 2010/0063241 | A1 | 3/2010 | Barnell et al. | |
| 2012/0156459 | A1* | 6/2012 | Lu .......................... | B32B 15/08 428/216 |

FOREIGN PATENT DOCUMENTS

| CN | 103980491 A | 8/2014 |
| JP | 2012224697 A | 11/2012 |
| KR | 20090067561 A | 6/2009 |

OTHER PUBLICATIONS

Koerner et al (Polymer design for high temperature shape memory: Low crosslink density polyimides, Polymer 54 (2013) 391-402), published online Nov. 8, 2012.*
Fang et al (Hyperbranched Polyimides for Gas Separation Applications. 1. Synthesis and Characterization, Macromolecules 2000, 33, 4639-4646), published on Web Jun. 8, 2000.*
Liu et al., Shape memory polymers and their composites in aerospace applications: a review, Smart Mater. Struct., 23, 023001 (22pp) (2014).
Xiao et al., Optically transparent high temperature shape memory polymers, Soft Matter, 12, 2894-2900 (2016).
Serafini et al., Thermally Stable Polyimides from Solutions of Monomeric Reactants, Journal of App. Polymer Science, vol. 16, pp. 905-915 (1972).
Shumaker et al., Synthesis of high temperature polyaspartimide-urea based shape memory polymers, Polymer, 53, 4537-4542 (2012).
Koerner et al., Polymer design for high temperature shape memory: Low crosslink density polyimides, Polymer, 54, pp. 391-402 (2013).
PCT International Search Report for PCT/CN/2015/070280 dated Apr. 16, 2015.
Fang et al., Hyperbranched Polyimides for Gas Separation Applications, 1, Synthesis and Characterization, Macromolecules 2000, 33, 4639-4646, Nov. 2000.
USPTO structure search, Feb. 2018.

* cited by examiner

*Primary Examiner* — Gregory Listvoyb
(74) *Attorney, Agent, or Firm* — Carter. DeLuca & Farrell LLP; Geroge Likourezos (57) ABSTRACT

A fast-response thermoplastic shape-memory polyimide and a preparation method thereof, related to a polyimide and a preparation method thereof. The present invention aims to solve the problem in high-temperature conditions of slow shape recovery poor stability, and poor mechanical properties of a shape-memory polymer prepared by utilizing an existing method. The structural formula of the polyamide of the present invention is as represented by formula (I). The preparation method is: 1. preparation of a diamine solution; 2. preparation of an anhydride-terminated high molecular weight polyamic acid; 3. preparation of a viscous sol-gel; and, 4. preparation of the thermoplastic shape-memory polyimide. The thermoplastic shape-memory polyimide prepared per the present invention is provided with a very fast shape recovery rate and improved shape-memory effect. The present invention is applicable in the field of polyimide preparation.

9 Claims, 5 Drawing Sheets

QUICK RESPONSIVE, SHAPE MEMORY THERMOSET POLYIMIDE AND PREPARATION METHOD THEREOF

CROSS REFERENCE TO RELATED APPLICATIONS

This application is a divisional of application Ser. No. 15/110,143 filed Sep. 13, 2016 which claims priority to PCT/CN2015/070280 filed Jan. 7, 2015 which claims priority to Chinese Appln. No. CN 201410221959.8 filed May 23, 2014.

TECHNICAL FIELD

The invention relates to a polyimide and its preparation method, more specifically, the present invention relates to a preparation method of a novel thermoset shape memory polyimide that has a glass transition temperature in the range of 190-197° C. and excellent thermodynamic properties, and can realize quick shape recovery within 5 seconds.

PRIOR ART

Shape memory polymers (SMP) have advantages such as large reversible strain, low density, easy processing, and easy control of the shape recovery temperature, and are finding more and more important applications in fields of, for example, smart textiles, biomedicals, and aerospace, etc. Thermoset SMP has a stable crosslinking structure and a high shape fixity and shape recovery rate, thus is the focus of current SMP studies. For example, American Composite Technology Development, Inc. (CTD) develops thermoset SMP composite materials for spacecraft antenna and light hinges for deploying solar array panel. The light hinges of 2 g can be used to drive a mass of 60 g, and can be used on lightweight flexural solar panels. The performance thereof is comparable to the shape memory alloy (SMA) hinges used on the earth observation spacecraft launched by American National Aeronautics and Space Administration (NASA), but lighter in weight and easier in installation (journal literature 1). However, conventional SMP usually has a glass transition temperature ($T_g$) lower than 120° C., while SMP-based driving device and aerospace applications and the like require high-temperature resistant SMP. Currently, there are few studies on high-temperature resistant SMP. Moreover, quick shape recovery is another important performance index for the application of SMP. However, most current SMPs recover shape slowly, typically in tens of seconds or even longer.

Polyimides (PI) are heterocyclic aromatic polymers containing imide characteristic groups in the main chain, and they have advantages such as high temperature resistance, radiation resistance, excellent mechanical properties, and versatile processing approaches. They have been widely used in fields of, such as, automobile, microelectronics, and aerospace (journal literature 2). Therefore, shape memory thermoset polyimides have broad application prospects in many different fields. Currently, the reported polyimides typically use crosslinkable end group-containing low-molecular weight monomers or their oligomers as the starting materials, which are subject to addition reactions to realize a curing process; the properties thereof are very stable, and thus can be used in harsh environment. Among those, PMR-15 (journal literature 3) is the representative product of matrix resin for heat-resistant polyimide composites.

Thermoset polyimides prepared from common low-molecular weight precursors via crosslinking of active groups have characteristics such as high strength, high modulus, high temperature stability and excellent processability. However, in comparison with the more than 100% reversible strain of conventional SMP, conventional thermoset polyimides shows no shape memory effect. In 2012, Shumaker et al. reports thermoset polymaleimide SMP having a Tg in the range of 110-164° C. (journal literature 4). In 2013, Vaia et al. reports thermoset polyimide SMP with a Tg of ca. 220° C. (journal literature 5). However, there is still no report on shape memory thermoset polyimides with Tg in the temperature range of 190° C.-197° C. until now.

Existing technical literatures:
Journal literature 1: Smart Mater. Struct. 2014, 23, 023001;
Journal literature 2: Polyimides: chemistry, structure and property relationships and materials, Science press, 2012, 09;
Journal literature 3: J. Apple. Polym. Sci, 1972, 16, 906;
Journal literature 4: Polymer 2012, 53, 4637-4642;
Journal literature 5: Polymer 2013, 54, 391-402.

Technical Problems

The objective of the present invention is to overcome the problems related to the high-temperature slow shape recovery, poor stability, and poor mechanical properties of current shape memory polymers prepared by known methods, and to provide a quick responsive, shape memory thermoset polyimide and a preparation method thereof.

SUMMARY OF THE INVENTION

Figure 1:
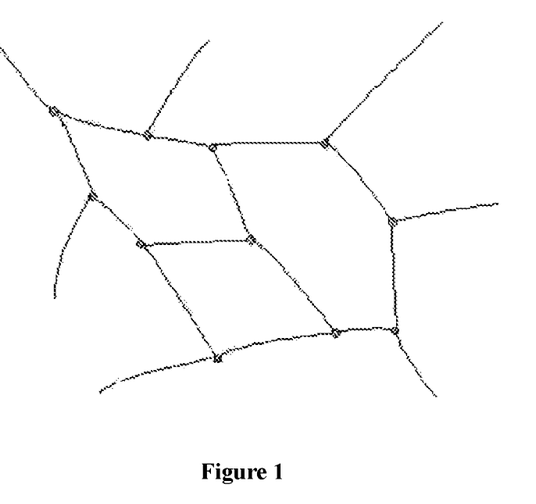
FIG. 1 shows a schematic network structure of the quick responsive, thermoset, shape memory polyimides prepared according to the present invention, wherein, the curved line represents the chain segments of polyimide molecules, and the dots represent triamine crosslinker.
Figure 2:
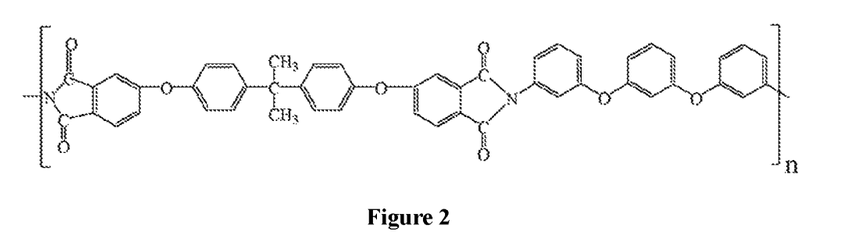
FIG. 2 shows the structure of the chain segments between the crosslinking points of the quick responsive, thermoset, shape memory polyimides prepared according to the present invention.
Figure 3:
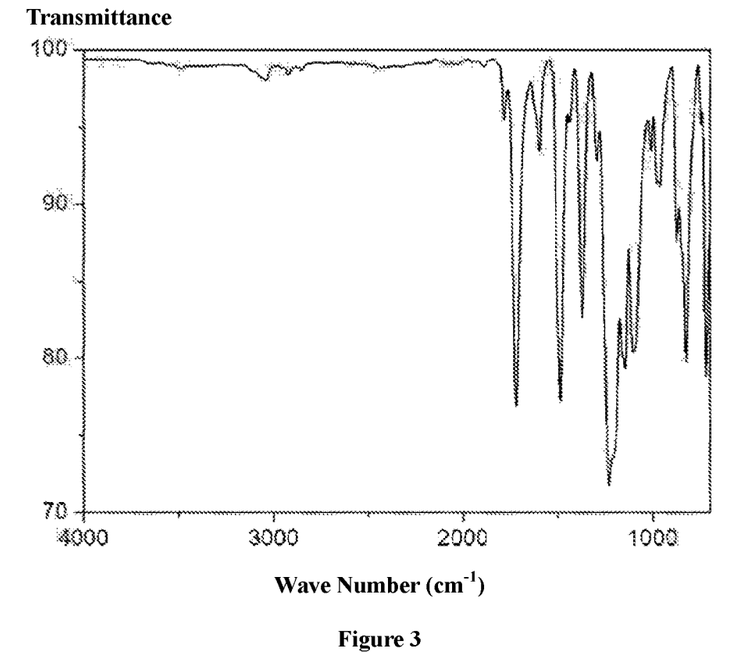
FIG. 3 shows an IR spectrum of the quick responsive, thermoset, shape memory polyimides prepared according to Example 1.
Figure 4:
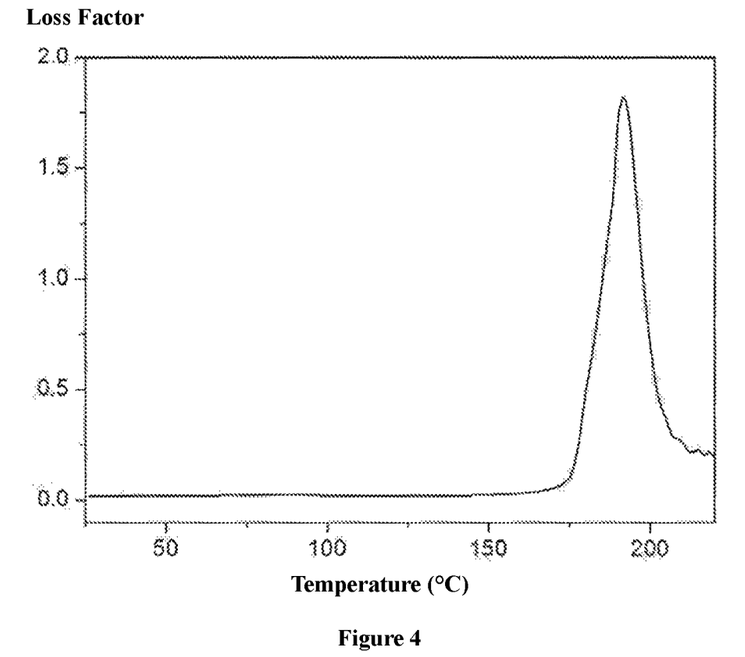
FIG. 4 shows a graph of the loss factor of the quick responsive, thermoset, shape memory polyimides prepared according to Example 1.
Figure 5:
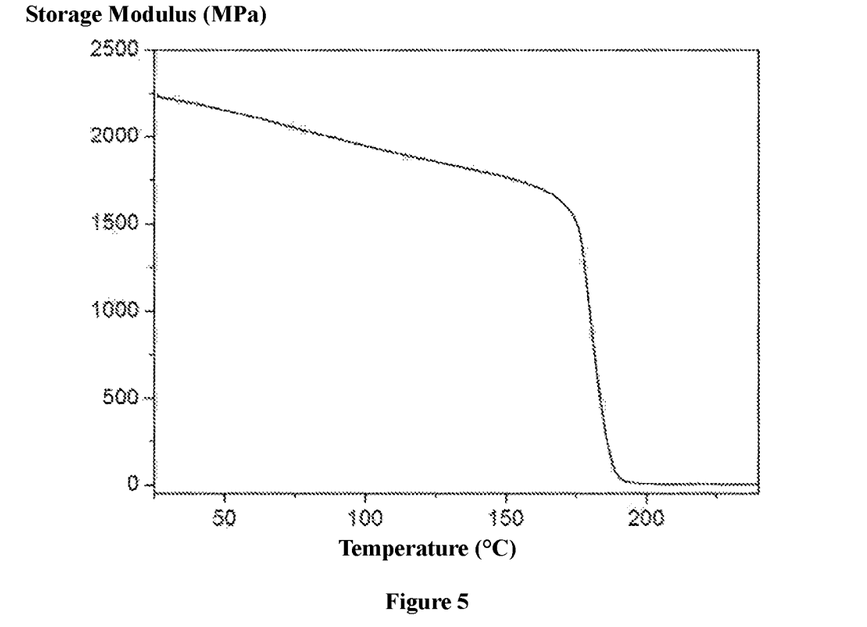
FIG. 5 shows a graph of the storage modulus of the quick responsive, thermoset, shape memory polyimides prepared according to Example 1.
Figure 6:
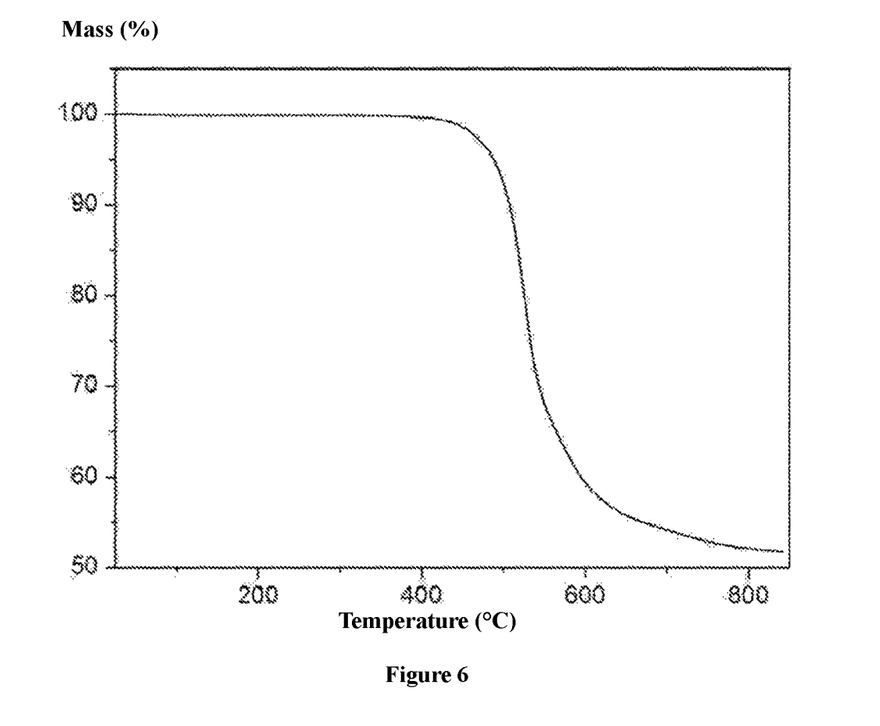
FIG. 6 shows a TGA graph of the quick responsive, thermoset, shape memory polyimides prepared according to Example 1.
Figure 7:
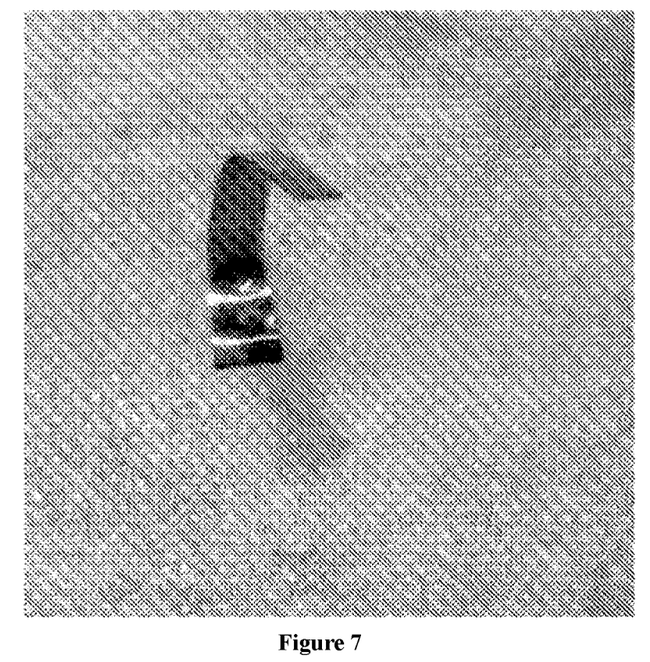
FIG. 7 shows a picture of the quick responsive, thermoset, shape memory polyimides in flat panel form prepared according to Example 1 and positioned on a hot stage, which was bended at elevated temperature and fixed at room temperature to yield a temporary shape.
Figure 8:
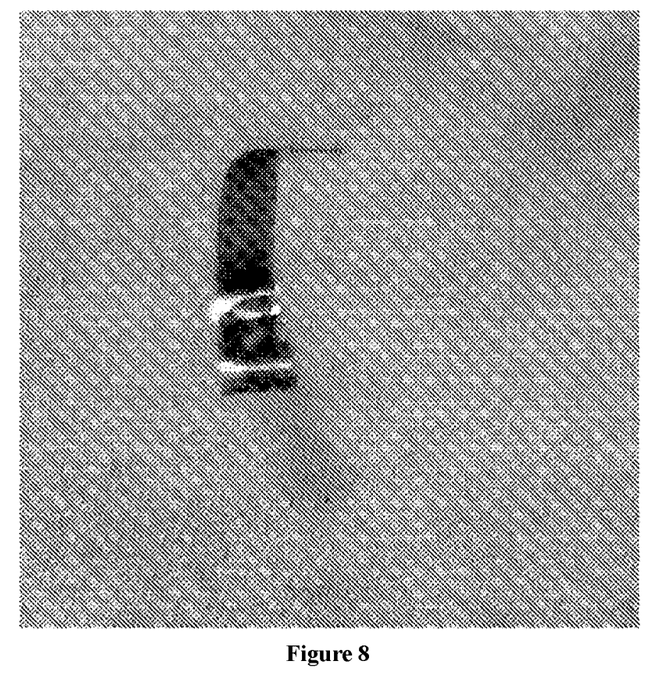
FIG. 8 is a picture showing the shape recovery of the quick responsive, thermoset, shape memory polyimides prepared according to Example 1 after 1 second on the hot stage of 210° C.
Figure 9:
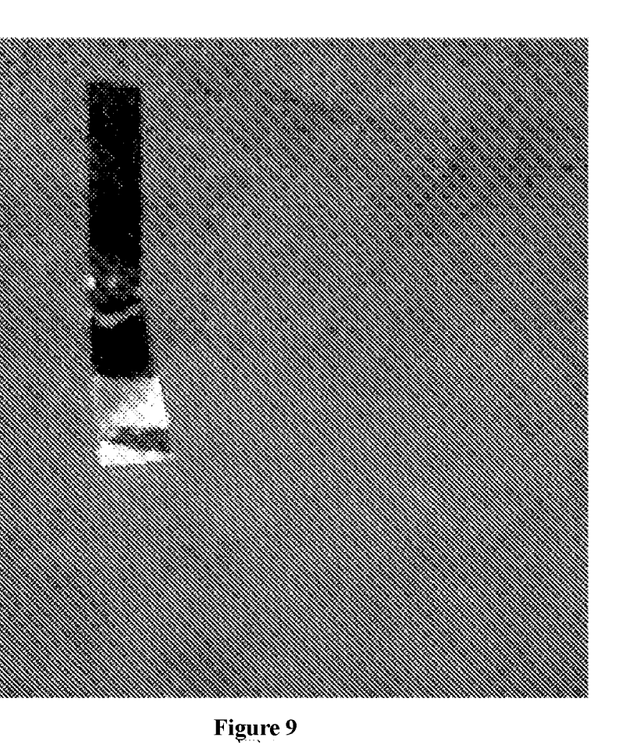
FIG. 9 is a picture showing the shape recovery of the quick responsive, thermoset, shape memory polyimides prepared according to Example 1 after 2 seconds on the hot stage of 210° C.
Figure 10:
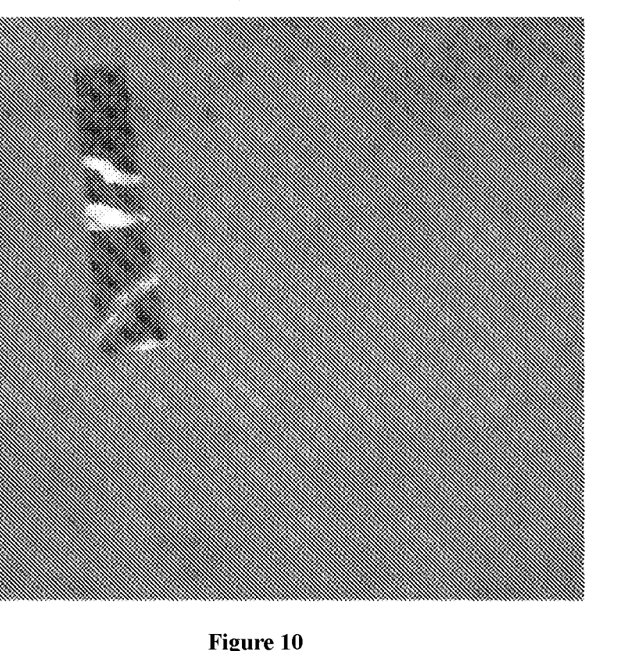
FIG. 10 is a picture showing the recovery to the original shape of the quick responsive, thermoset, shape memory polyimides prepared according to Example 1 after 3 seconds on the hot stage of 210° C.

The inventive quick responsive, shape memory thermoset polyimide has a structure of:

wherein, n is from 58 to 156, and the quick responsive, shape memory thermoset polyimides have a molecular weight of 46K-124K between two triamino-crosslinker molecules.

The preparation method of the quick responsive, shape memory thermoset polyimide according to the present invention is achieved by the following steps:

I. Preparation of a Diamine Solution

Weigh out 1,3-bis(3-aminophenoxy)benzene monomer and charge it into a three-neck flask containing N,N-dimethylacetamide solvent, stir the contents in the flask under the protection of dry nitrogen at room temperature until 1,3-bis(3-aminophenoxy)benzene monomer is completely dissolved, so as to obtain a diamine solution;

wherein the molar ratio by volume between N,N-dimethylacetamide solvent and 1,3-bis(3-aminophenoxyl)benzene monomer is 1 mL:(0.2-0.33) mmoL.

II. Preparation of an Anhydride-Terminated High Molecular Weight Polyamic Acid

Add Bisphenol A type diether dianhydride monomer for 4-6 times to the diamine solution obtained in step I, and then stir the resultant for 16-20 hours at a speed of 200-300 r/min at room temperature to obtain an anhydride-terminated high molecular weight polyamic acid; wherein the amount of each addition of the bisphenol A type diether dianhydride monomer is equal to or less than half of the amount of prior addition;

wherein, the mass ratio of the bisphenol A type diether dianhydride monomer mentioned in step II to 1,3-bis(3-aminophenoxy)benzene in the diamine solution was 1:(0.85-0.97).

III. Preparation of a Viscous Sol-Gel

Add tri(4-aminophenyl)amine to the anhydride-terminated high molecular weight polyamic acid obtained in step II, and stir the resultant for 5-7 hours at a speed of 260-350 r/min at room temperature to obtain a sol-gel. Then the obtained sol-gel is dried at 40-65° C. in a vacuum oven for 0.5-2 hours to obtain a viscous sol-gel;

the mass ratio of the tri(4-aminophenyl)amine as mentioned in step III to bisphenol A type diether dianhydride monomer in the anhydride-terminated high molecular weight polyamic acid is (0.02-0.10):1.

IV. Preparation of Thermoset, Shape Memory Polyimides

Pour the viscous sol-gel obtained in step III onto a substrate, heat the resultant at a heating rate of 1-2° C./min from room temperature to 70-90° C., and keep it at the temperature for 1-2 hours;

then heat the resultant at a heating rate of 1-2° C./min to 120-140° C., and keep it at the temperature for 1-2 hours;

then heat the resultant at a heating rate of 1-2° C./min to 170-190° C., and keep it at the temperature for 1-2 hours;

then heat the resultant at a heating rate of 1-3° C./min to 220-250° C., and keep it at the temperature for 1-2 hours;

then heat the resultant at a heating rate of 1-3° C./min to 270-290° C., and keep it at the temperature for 1-2 hours;

finally, cool the resultant at a rate of 1-3° C./min to room temperature;

immerse the substrate that has already been cooled down to room temperature in distilled water to peel off a solid film, which is then washed for 3-5 times using the distilled water and finally heated at a temperature condition of 120-180° C. for 360-600 minutes, so as to obtain the thermoset, shape memory polyimides.

Beneficial Technical Effects

1. The thermoset, shape memory polyimides prepared according to the present invention have a $T_g$ of 190-197° C., ensuring that the shape memory effect thereof can be applied to high temperature areas, compared with the $T_g$ of conventionally used shape memory polymers (mostly below 120° C.), the $T_g$ value is increased by at least 70° C.

2. The thermoset, shape memory polyimides prepared according to the present invention have a storage modulus of about 2.22-2.90 GPa in the glassy state at a room temperature of 30° C.; a storage modulus of about 5.36-6.80 MPa in the rubbery state at a higher temperature of ($T_g$+20° C.). The materials prepared according to the present invention ensure that, when the prepared SMP are used as structural materials, they have relatively small change of modulus within the higher application temperature range relative to that of known SMP materials, ensuring the stability of the size and shape of the structural parts.

3. The thermoset, shape memory polyimides prepared according to the present invention have a 5% weight loss temperature of 487-495° C., a 52.1-53.9% residue at 800° C., indicating an excellent heat resistance of the inventive thermoset, shape memory polyimides.

4. The thermoset, shape memory polyimides prepared according to the present invention have a shape recovery time of 3-5 seconds from 180° bending, which is a fast recovery compared with an average 100 seconds recovery time of conventional epoxy SMP.

EXAMPLES

Example 1

A quick responsive, high-performance thermoset, shape memory polyimide according to the example, had a structure of:

wherein, n was 58-156, the said quick responsive, high-performance thermoset, shape memory polyimide had a molecular weight of 46-124 k.

The example used 1,3-bis(3-aminophenoxy)benzene and bisphenol A type diether dianhydride as the reaction monomers to prepare an anhydride terminated polyamic acid precursor, which then formed a network structure by using triamine(4-aminophenyl) to crosslink the polyamic acid, and the resultant was subject to a gradient heating procedure to provide a thermoset shape memory polyimide.

Example 2

This example was almost the same as Example 1, except that n was 80-156, and the quick responsive, high-performance thermoset, shape memory polyimide had a molecular weight of 80-124 k.

Example 3

This example was almost the same as Example 1 or 2, except that n was 100-156, and the quick responsive, high-performance thermoset, shape memory polyimide had a molecular weight of 100-124 k.

Example 4

The preparation method of a quick responsive, high-performance, thermosetting, shape memory polyimide according to this example was achieved by the following steps:

I. Preparation of a Diamine Solution 1,3-bis(3-aminophenoxy)benzene monomer was weighted out and charged into a three-neck flask containing N,N-dimethylacetamide solvent, and then stirred under the protection of dry nitrogen at room temperature until 1,3-bis(3-aminophenoxy)benzene monomer was completely dissolved, so as to provide a diamine solution;

wherein the molar ratio by volume between N,N-dimethylacetamide solvent and 1,3-bis(3-aminophenoxy)benzene monomer was 1 mL:(0.2-0.33) mmoL;

II. Preparation of Anhydride-Terminated High Molecular Weight Polyamic Acid

Bisphenol A type diether dianhydride monomer was added for 4-6 times to the diamine solution obtained in step I, the resultant was stirred for 16-20 hours at a speed of 200-300 r/min at room temperature to obtain an anhydride-terminated high molecular weight polyamic acid; wherein, the amount of each addition of the bisphenol A type diether dianhydride monomer is equal to or less than half of the amount of prior addition;

wherein, the mass ratio of the bisphenol A type diether dianhydride monomer as mentioned in step II to 1,3-bis(3-aminophenoxy)benzene in the diamine solution was 1:(0.85-0.97);

III. Preparation of a Viscous Sol-Gel

Tri(4-aminophenyl)amine was added to the anhydride-terminated high molecular weight polyamic acid obtained in step II, the resultant was stirred for 5-7 hours at a speed of 260-350 r/min at room temperature to produce a sol-gel. Then the obtained sol-gel was dried at 40-65° C. in a vacuum oven for 0.5-2 hours to yield a viscous sol-gel;

the mass ratio of the tri(4-aminophenyl)amine mentioned in step III to bisphenol A type diether dianhydride monomer in the anhydride-terminated high molecular weight polyamic acid was (0.02-0.10):1;

IV. Preparation of Thermoset, Shape Memory Polyimides

The viscous sol-gel obtained in step III was poured onto a substrate, then was heated from room temperature at a heating rate of 1-2° C./min to 70-90° C., and kept at the temperature for 1-2 hours; then was heated at a heating rate of 1-2° C./min to 120-140° C., and kept at the temperature for 1-2 hours; then was heated at a heating rate of 1-2° C./min to 170-190° C., and kept at the temperature for 1-2 hours; then was heated at a heating rate of 1-3° C./min to 220-250° C., and kept at the temperature for 1-2 hours; then was heated at a heating rate of 1-3° C./min to 270-290° C., and kept at the temperature for 1-2 hours;

finally, it was cooled at a rate of 1-3° C./min to room temperature; the substrate that has already been cooled down to room temperature was immersed in distilled water to peel off a solid film, which was then washed for 3-5 times using distilled water and finally heated at 120-180° C. for 360-600 minutes to produce thermoset, shape memory polyimides.

The N,N-dimethylacetamide mentioned in Example 1 was commercial available and of analytical pure grade, and was vacuum distilled after the removal of water.

The tri(4-aminophenyl)amine in Example 3 comprised three amino-functional group, rendering the total number of amino functional groups of tri(4-aminophenyl)amine and diamine being equal to the total number of anhydride functional groups of dianhydride monomer, and the mass ratio of the dianhydride to tri(4-aminophenyl)amine was 1:0.02-1:0.10.

The present example used 1,3-bis(3-aminophenoxy)benzene and bisphenol A type diether dianhydride as the reaction monomers to prepare anhydride terminated polyamic acid precursor, which was then crosslinked to form a network structure by using triamine(4-aminophenyl), and further subject to a gradient heating procedure to provide thermoset shape memory polyimide.

The reaction scheme of the step II according to the example was as follows:

The reaction scheme of the step IV according to this example was as follows:

Example 5

This example was almost the same as Example 4, except that the purity of 1,3-bis(3-aminophenoxy)benzene monomer as mentioned in step I was 98%.

Example 6

This example was almost the same as Examples 4 or 5, except that the purity of the bisphenol A type diether dianhydride monomer as mentioned in step II was 97%.

Example 7

This example was almost the same as one of the Examples 4-6, except that the purity of tri(4-aminophenyl)amine as mentioned in step III was >98%.

Example 8

This example was almost the same as one of the Examples 4-7, except that the molar ratio by volume between N,N-dimethylacetamide solvent and 1,3-bis(3-aminophenoxy)benzene monomer as mentioned in step I was 1 mL:0.27-0.32 mmoL.

Example 9

This example was almost the same as one of the Examples 4-8, except that the molar ratio by volume between N,N-dimethylacetamide solvent and 1,3-bis(3-aminophenoxy)benzene monomer as mentioned in step I was 1 mL: 0.33 mmoL.

Example 10

This example was almost the same as one of the Examples 4-9, except that the mass ratio of bisphenol A type diether dianhydride monomer to 1,3-bis(3-aminophenoxy)benzene monomer in the diamine solution as mentioned in step II was 1:(0.90-0.95).

Example 11

This example was almost the same as one of the Examples 4-10, except that the mass ratio of bisphenol A type diether dianhydride monomer to 1,3-bis(3-aminophenoxy)benzene monomer in the diamine solution as mentioned in step II was 1: (O. 90-0.92).

Example 12

This example was almost the same as one of the Examples 4-11, except that the mass ratio of bisphenol A type diether dianhydride monomer to 1,3-bis(3-aminophenoxy)benzene monomer in the diamine solution as mentioned in step II was 1:0.91.

Example 13

This example was almost the same as one of the Examples 4-12, except that the mass ratio of tri(aminophenyl)amine to bisphenol A type diether dianhydride monomer in the anhydride terminated high molecular weight polyamic acid as mentioned in step III was (0.03-0.09):1.

Example 14

This example was almost the same as one of the Examples 4-13, except that the mass ratio of tri(aminophenyl)amine to bisphenol A type diether dianhydride monomer in the anhydride terminated high molecular weight polyamic acid as mentioned in step III was (0.04-0.08):1.

Example 15

This example was almost the same as one of the Examples 4-14, except that the mass ratio of tri(aminophenyl)amine to bisphenol A type diether dianhydride monomer in the anhydride terminated high molecular weight polyamic acid as mentioned in step III was (0.05-0.07):1.

Example 16

This example was almost the same as one of the Examples 4-15, except that the mass ratio of tri(aminophenyl)amine to bisphenol A type diether dianhydride monomer in the anhydride terminated high molecular weight polyamic acid as mentioned in step III was 0.06:1.

Example 17

This example was almost the same as one of the Examples 4-16, except that the stirring as mentioned in step II was at a rate of 250-300 r/min and lasted for 18-20 hours.

Example 18

This example was almost the same as one of the Examples 4-17, except that the stirring as mentioned in step II was at a rate of 280-300 r/min and lasted for 19-20 hours.

Example 19

This example was almost the same as one of the Examples 4-18, except that the stirring as mentioned in step III was at a rate of 280-350 r/min and lasted for 5-7 hours.

Example 20

This example was almost the same as one of the Examples 4-19, except that the stirring as mentioned in step III was at a rate of 300-350 r/min and lasted for lasted 6-7 hours.

Example 21

This example was almost the same as one of the Examples 4-20, except that the stirring as mentioned in step III was at a rate of 320-350 r/min and lasted for 6-7 hours.

Example 22

This example was almost the same as one of the Examples 4-21, except that the stirring as mentioned in step III was at a rate of 320-350 r/min and lasted for 6-7 hours.

Example 23

This example was almost the same as one of the Examples 4-22, except that the sol-gel obtained in step III was dried in a vacuum oven at a temperature of 45-65° C. for 0.8-2 hours.

Example 24

This example was almost the same as one of the Examples 4-23, except that the sol-gel obtained in step III was dried in a vacuum oven at a temperature of 50-65° C. for 1-2 hours.

Example 25

This example was almost the same as one of the Examples 4-24, except that the sol-gel obtained in step III was dried in a vacuum oven at a temperature of 55-65° C. for 1.5-2 hours.

Example 26

This example was almost the same as one of the Examples 4-25, except that the sol-gel obtained in step III was dried in a vacuum oven at a temperature of 60-65° C. for 1.5-2 hours.

Example 27

This example was almost the same as one of the Examples 4-26, except that the sol-gel obtained in step III was dried in a vacuum oven at a temperature of 60-65° C. for 1.8-2 hours.

Example 28

This example was almost the same as one of the Examples 4-27, except that, in step IV,
the resultant was heated from room temperature at a rate of 1-2° C./min to 75-90° C., and was kept at the temperature for 1-2 hours;
then the resultant was heated at a rate of 1-2° C./min to 125-140° C., and was kept at the temperature for 1-2 hours;
then the resultant was heated at a rate of 1-2° C./min to 175-190° C., and was kept at the temperature for 1-2 hours;
then the resultant was heated at a rate of 1-3° C./min to 230-250° C., and was kept at the temperature for 1-2 hours;
then the resultant was heated at a rate of 1-3° C./min to 275-290° C., and was kept at the temperature for 1-2 hours;
finally, the resultant was cooled at a rate of 1-3° C./min to room temperature.

Example 29

This example was almost the same as one of the Examples 4-28, except that, in step IV,
the resultant was heated from room temperature at a rate of 1-2° C./min to 80-90° C., and was kept at the temperature for 1-2 hours;
then the resultant was heated at a rate of 1-2° C./min to 130-140° C., and was kept at the temperature for 1-2 hours;
then the resultant was heated at a rate of 1-2° C./min to 180-190° C., and was kept at the temperature for 1-2 hours;
then the resultant was heated at a rate of 1-3° C./min to 235-250° C., and was kept at the temperature for 1-2 hours;
then the resultant was heated at a rate of 1-3° C./min to 280-290° C., and was kept at the temperature for 1-2 hours;
finally the resultant was cooled at a rate of 1-3° C./min to room temperature.

Example 30

This example was almost the same as one of the Examples 4-29, except that, in step IV,
the resultant was heated from room temperature at a rate of 1-2° C./min to 85-90° C., and was kept at the temperature for 1.5-2 hours;
then the resultant was heated at a rate of 1-2° C./min to 135-140° C., and was kept at the temperature for 1.5-2 hours;
then the resultant was heated at a rate of 1-2° C./min to 185-190° C., and was kept at the temperature for 1.5-2 hours;
then the resultant was heated at a rate of 1-3° C./min to 240-250° C., and was kept at the temperature for 1.5-2 hours;
then the resultant was heated at a rate of 1-3° C./min to 285-290° C., and was kept at the temperature for 1.5-2 hours;
finally the resultant was cooled at a rate of 1-3° C./min to room temperature.

Example 31

This example was almost the same as one of the Examples 4-30, except that, in step IV, the heating was performed at a temperature of 130-180° C. for 380-600 minutes.

Example 32

This example was almost the same as one of the Examples 4-31, except that, in step IV, the heating was performed at a temperature of 140-180° C. for 400-600 minutes.

Example 33

This example was almost the same as one of the Examples 4-32, except that, in step IV, the heating was performed at a temperature of 150-180° C. for 450-600 minutes.

Example 34

This example was almost the same as one of the Examples 4-33, except that, in step IV, the heating was performed at a temperature of 155-180° C. for 480-600 minutes.

Example 35

This example was almost the same as one of the Examples 4-34, except that, in step IV, the heating was performed at a temperature of 160-180° C. for 500-600 minutes.

Example 36

This example was almost the same as one of the Examples 4-35, except that, in step IV, the heating was performed at a temperature of 165-180° C. for 520-600 minutes.

Example 37

This example was almost the same as one of the Examples 4-36, except that, in step IV, the heating was performed at a temperature of 170-180° C. for 550-600 minutes.

Example 38

This example was almost the same as one of the Examples 4-37, except that, in step IV, the heating was performed at a temperature of 175-180° C. for 580-600 minutes.

What is claimed is:
1. A method for preparing a quick responsive, high-performance, thermoset shape memory polyimide, having the following steps of:
I. preparation of a diamine solution:
weighting out 1,3-bis(3-aminophenoxy)benzene monomer and charging it into a three-neck flask containing N,N-dimethylacetamide solvent, then stirring the contents in the flask under the protection of dry nitrogen at room temperature until the 1,3-bis-(3-aminophenoxy) benzene monomer is completely dissolved, so as to obtain a diamine solution;

wherein the molar ratio by volume between N,N-dimethylacetamide solvent and 1,3-bis(3-aminophenoxy) benzene monomer is 1 mL: (0.2-0.33) mmoL;

II. preparation of an anhydride-terminated high molecular weight polyamic acid: adding bis-phenol A type diether-dianhydride monomer for 4-6 times to the diamine solution obtained in step I, then stirring the resultant for 16-20 hours at a speed of 200-300 r/min at room temperature to obtain the anhydride-terminated high molecular weight polyamic acid; wherein the amount of each addition of the bisphenol A type diether dianhydride monomer is equal to or less than half of the amount of prior addition;

wherein the mass ratio of the bisphenol A type diether dianhydride monomer as described in step II to 1,3-bis (3-aminophenoxy)benzene monomer in the diamine solution is 1: (0.85-0.97);

III. preparation of a viscous sol-gel adding tri(4-aminophenyl)amine to the anhydride-terminated high molecular weight polyamic acid obtained in step II, and then stirring the resultant for 5-7 hours at a speed of 260-350 r/min at room temperature to obtain a sol-gel, and drying the obtained sol-gel at 40-65° C. in a vacuum oven for 0.5-2 hours to obtain a viscous sol-gel;

and the mass ratio of the tri(4-aminophenyl)amine as described in step III to the bisphenol A type diether dianhydride monomer in the anhydride-terminated high molecular weight polyamic acid is (0.02-0.10):1;

IV. preparation of a thermoset shape memory polyimide pouring the viscous sol-gel obtained in step III on a substrate, heating the resultant from room temperature to 70-90° C. at a heating rate of 1-2° C./min, and keeping it at the temperature for 1-2 hours;

then heating the resultant to 120-140° C. at a heating rate of 1-2° C./min, and keeping it at the temperature for 1-2 hours;

then heating the resultant to 170-190° C. at a heating rate of 1-2° C./min, and keeping it at the temperature for 1-2 hours;

then heating the resultant to 220-250° C. at a heating rate of 1-3° C./min, and keeping it at the temperature for 1-2 hours;

then heating the resultant to 270-290° C. at a heating rate of 1-3° C./min, and keeping it at the temperature for 1-2 hours; and finally, cooling the resultant at a cooling rate of 1-3° C./min to room temperature;

immersing the substrate that has already been cooled down to room temperature in distilled water to peel off a solid film, then washing the solid film for 3-5 times with distilled water and finally heating it at a temperature condition of 120-180° C. for 360-600 minutes to produce the thermoset shape memory polyimide.

2. The method for preparing a quick responsive, high-performance, thermoset shape memory polyimide according to claim 1, wherein the purity of the 1,3-bis(3-aminophenoxy)benzene monomer in step I is 98%.

3. The method for preparing a quick responsive, high-performance, thermoset shape memory polyimide according to claim 1, wherein in step II, the purity of the bisphenol A type diether dianhydride monomer is 97%.

4. The method for preparing a quick responsive, high-performance, thermoset shape memory polyimide according to claim 1, wherein the purity of the tri(4-aminophenyl) amine is >98%.

5. The method for preparing a quick responsive, high-performance, thermoset shape memory polyimide according to claim 1, wherein in step I, the molar ratio by volume between N,N-dimethylacetamide solvent and 1,3-bis(3-aminophenoxy) benzene monomer is 1 mL: 0.25 mmoL.

6. The method for preparing a quick responsive, high-performance, thermoset shape memory polyimide according to claim 1, wherein in step II, the mass ratio of the bisphenol A type diether dianhydride monomer to 1,3-bis(3-aminophenoxy) benzene monomer in the diamine solution is 1:(0.90-0.95).

7. The method for preparing a quick responsive, high-performance, thermoset shape memory polyimide according to claim 1, wherein in step III, the mass ratio of the tri(aminophenyl)amine to the bisphenol A type diether dianhydride monomer in the anhydride terminated high molecular weight polyamic acid is (0.05-0.08):1.

8. The method for preparing a quick responsive, high-performance, thermoset shape memory polyimide according to claim 1, wherein in step IV, heating the resultant from room temperature to 80-90° C. at a heating rate of 1-2° C./min, and keeping it at the temperature for 1-2 hours;

then heating the resultant to 130-140° C. at a heating rate of 1-2° C./min, and keeping it at the temperature for 1-2 hours;

then heating the resultant to 180-190° C. at a heating rate of 1-2° C./min, and keeping it at the temperature for 1-2 hours;

then heating the resultant to 240-250° C. at a heating rate of 1-3° C./min, and keeping it at the temperature for 1-2 hours;

then heating the resultant to 280-290° C. at a heating rate of 1-3° C./min, and keeping it at the temperature for 1-2 hours; and finally keeping it the resultant at a cooling rate of 1-3° C./min to room temperature.

9. The method for preparing a quick responsive, high-performance, thermoset shape memory polyimide according to claim 1, wherein in step IV, the heating at a temperature of 150-180° C. is conducted for 450-600 minutes.

* * * * *